US008452078B2

(12) United States Patent
Prokhorov (10) Patent No.: US 8,452,078 B2
(45) Date of Patent: May 28, 2013

(54) SYSTEM AND METHOD FOR OBJECT RECOGNITION AND CLASSIFICATION USING A THREE-DIMENSIONAL SYSTEM WITH ADAPTIVE FEATURE DETECTORS

(75) Inventor: Danil V. Prokhorov, Canton, MI (US)

(73) Assignee: Toyota Motor Engineering & Manufacturing North America, Erlanger, KY (US)

(*) Notice: Subject to any disclaimer, the term of this patent is extended or adjusted under 35 U.S.C. 154(b) by 1260 days.

(21) Appl. No.: 12/252,080

(22) Filed: Oct. 15, 2008

(65) Prior Publication Data
US 2010/0092073 A1 Apr. 15, 2010

(51) Int. Cl.
G06K 9/00 (2006.01)
(52) U.S. Cl.
USPC ............ 382/154; 382/100; 382/168; 382/170
(58) Field of Classification Search
None
See application file for complete search history.

(56) References Cited

U.S. PATENT DOCUMENTS

| | | | |
|---|---|---|---|
| 2,903,002 A | 9/1959 | Adkins | |
| 3,430,851 A | 3/1969 | Abt | |
| 3,658,249 A | 4/1972 | Sharpe | |
| 5,277,208 A | 1/1994 | Mansur | |
| 5,423,340 A | 6/1995 | Campbell et al. | |
| 5,954,071 A | 9/1999 | Magliocca | |
| 6,236,749 B1* | 5/2001 | Satonaka et al. | 382/154 |
| 6,405,877 B1 | 6/2002 | Nemedi et al. | |
| 6,823,261 B2 | 11/2004 | Sekiguchi | |
| 7,003,136 B1* | 2/2006 | Harville | 382/103 |
| 7,146,991 B2 | 12/2006 | Stockert | |
| 7,214,128 B2* | 5/2007 | Kriesel | 452/157 |
| 7,343,039 B2* | 3/2008 | Liu et al. | 382/170 |
| 7,446,766 B2* | 11/2008 | Moravec | 345/424 |
| 7,583,275 B2* | 9/2009 | Neumann et al. | 345/633 |
| 7,831,087 B2* | 11/2010 | Harville | 382/154 |
| 7,995,055 B1* | 8/2011 | Ma et al. | 345/420 |
| 2006/0103927 A1 | 5/2006 | Samukawa et al. | |

(Continued)

FOREIGN PATENT DOCUMENTS

| | | |
|---|---|---|
| DE | 101 48 063 | 4/2003 |
| JP | 6-047353 | 2/1994 |

(Continued)

OTHER PUBLICATIONS

Ranzato et al.; "Unsupervised Learning of Invariant Feature Hierarchies with Applications to Object Recognition"; Computer Vision and Pattern Recognition, 2007. CVPR '07. IEEE Conference on; Jun. 2007, pp. 1-8.*

(Continued)

Primary Examiner — Tom Y Lu
Assistant Examiner — Thomas Conway
(74) Attorney, Agent, or Firm — Oblon, Spivak, McClelland, Maier & Neustadt, L.L.P.

(57) ABSTRACT

A method including imaging an object in three-dimensions; binning data of the imaged object into three-dimensional regions having a predetermined size; determining a density value p of the data in each bin; inputting the p density values of the bins into a first layer of a computational system including a corresponding processing element for each of the bins; calculating an output O of the processing elements of the computational system while restricting the processing elements to have weights Wc1 connecting the processing elements to the corresponding p density values; and communicating an estimated class of the scanned object based on the calculated system outputs.

20 Claims, 8 Drawing Sheets

U.S. PATENT DOCUMENTS

| | | |
|---|---|---|
| 2006/0262007 A1 | 11/2006 | Bonthron et al. |
| 2007/0071311 A1* | 3/2007 | Rovira-Mas et al. ......... 382/154 |
| 2007/0127816 A1 | 6/2007 | Balslev et al. |
| 2008/0021625 A1 | 1/2008 | Ohtomo |
| 2008/0042895 A1 | 2/2008 | Inaba |

FOREIGN PATENT DOCUMENTS

| | | |
|---|---|---|
| JP | 9-085189 | 3/1997 |
| JP | 10-283478 | 10/1998 |
| JP | 2002-303671 | 10/2002 |
| JP | 2006-048568 | 2/2006 |
| JP | 2007-142517 | 6/2007 |

OTHER PUBLICATIONS

Feldkamp et al.; "Multiple-start directed search for improved NN solution"; Proceedings. 2004 IEEE International Joint Conference on Neural Networks; Jul. 2004, vol. 2, pp. 991-996.*

Scheunert et al.; "Generalized Grid Framework for multi sensor data fusion"; 11th International Conference on Information Fusion, Jul. 2008; pp. 1-7.*

U.S. Appl. No. 12/697,808, filed Feb. 1, 2010, Prokhorov, et al.

* cited by examiner

FIRST LAYER INDEXES iC1

|  | 0 | 1 | 2 | 3 | 4 | 5 | 6 = Nc1 |
|---|---|---|---|---|---|---|---|
| 0 | X |   |   |   |   | X | X |
| 1 | X | X |   |   |   | X | X |
| 2 | X | X | X |   |   | X | X |
| 3 |   | X | X | X |   | X | X |
| 4 |   |   | X | X | X | X | X |
| 5 |   |   |   | X | X | X | X |
| N = 6 |   |   |   |   | X | X | X |

ORIGINAL INDEXES ind

X ≡ CONNECTED

*Fig.5*

MATRIX CONNECTION TABLE

SYSTEM AND METHOD FOR OBJECT RECOGNITION AND CLASSIFICATION USING A THREE-DIMENSIONAL SYSTEM WITH ADAPTIVE FEATURE DETECTORS

BACKGROUND OF THE INVENTION

1. Field of the Invention

The present invention relates generally to computerized object recognition and, more particularly, to object recognition and classification using a three-dimensional (3D) system.

2. Description of the Related Art

Computerized object recognition is the process of finding or identifying an object in an image or video. Recognizing an object can include the process of classifying objects belonging to distinct classes. Object classifying using computer vision can be applied to, among other things, automated production processes, security, and automotive applications.

The majority of object recognition technologies today use camera images as the input or another suitable two-dimensional sensor. Each image serves as an input to an object recognition algorithm, such as a neural network or another machine learning system. The image is usually fed into the algorithm as a collection of features, e.g., pixel intensities. The temporal order of such features is meaningless in the context of a single image. More importantly, the number of features can be very large, making the task of object recognition computationally very demanding. Most object recognition technologies inputting 3-D images project the collected data into a two-dimensional space and then track features as just described.

Object recognition is known to be especially difficult if the object position and orientation is not constrained (i.e., the object may appear from an arbitrary viewing angle). In order to recognize and classify objects with a high degree of reliability, computer vision systems need to account for this variance. Reliable rotational invariant recognition of objects has remained an unsolved problem.

SUMMARY OF THE INVENTION

In order to address these problems among others, the present invention uses data from a 3D imaging device. Unlike traditional two-dimensional scanners, also known as line scanners, 3D imaging devices can provide highly accurate distance measurements in the spherical coordinate system.

The invention further enables the recognition task to be carried out directly in the original 3D space, rather than performing projections of the original 3D data onto 2D surfaces such as employed by conventional imaging devices and 2D laser scanners.

Instead of choosing features a priori, 3D features represented as collections of adjustable parameters (weights) are made adaptive and learned from data representing the object in three dimensions.

In order to obtain a system with decreased sensitivity to rotational invariance (i.e., a "rotation invariant system"), the present invention uses as an option multiple binned 3D data as inputs for the system. The binned data show different viewing angles for the same objects as simultaneously presented to the system for object classification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
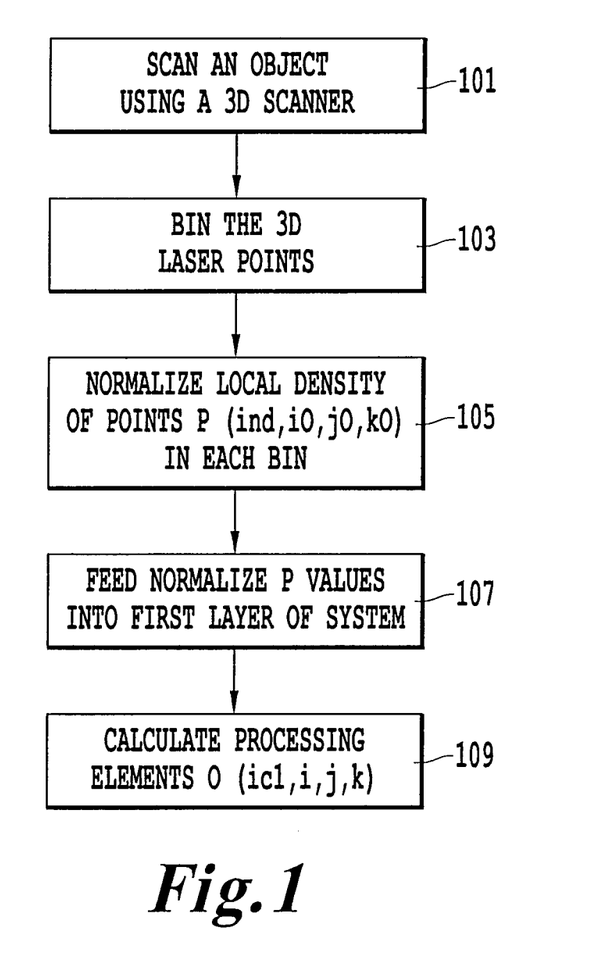
FIG. 1 is a flowchart illustrating steps for calculating an output of processing elements of a computational system according to one embodiment of the invention.

Referring now to the drawings, wherein like reference numerals designate identical or corresponding parts/steps throughout the several views. FIG. 1 is a flowchart illustrating steps for calculating an output of processing elements of a computational system according to one embodiment of the invention. In step 101, an object is scanned using a 3D scanner. Imaging of an object can be accomplished in three dimensions using both scanning and non-scanning systems. The invention is not limited to a scanning system. However, a system providing highly accurate distance measurements is preferred. The 3D laser design employed by the inventor included many laser sending-receiving heads rotating around a vertical axis. The data from a 3D scanner can be represented conveniently in three spatial dimensions: X coordinate, Y coordinate, and Z coordinate of the Cartesian coordinate system. However, the computational system of the invention can be adapted to use a different coordinate system, such as the scanner's original spherical system.

Figure 2A:
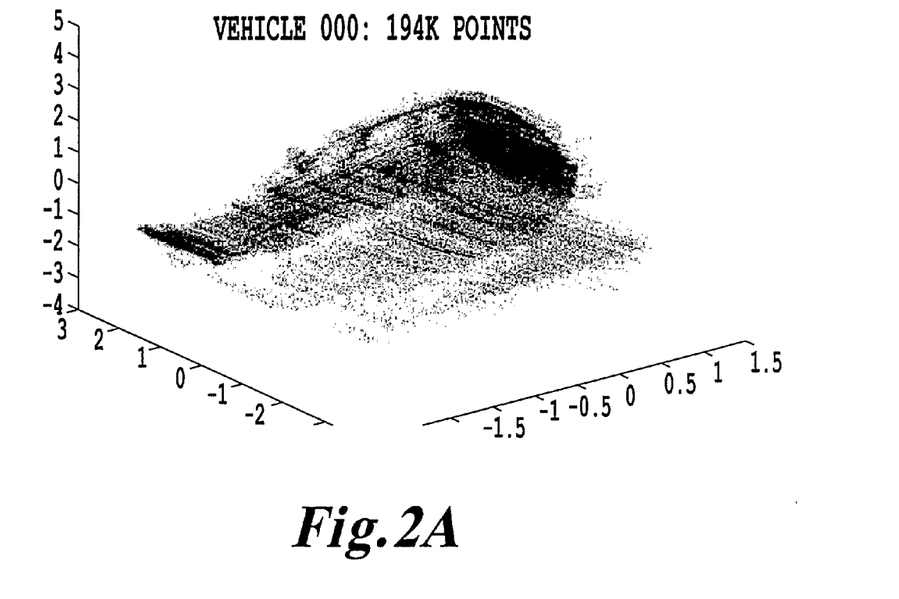
FIGS. 2A and 2B illustrate a 3D scan of a vehicle and a non-vehicle, respectively.
Figure 2B:
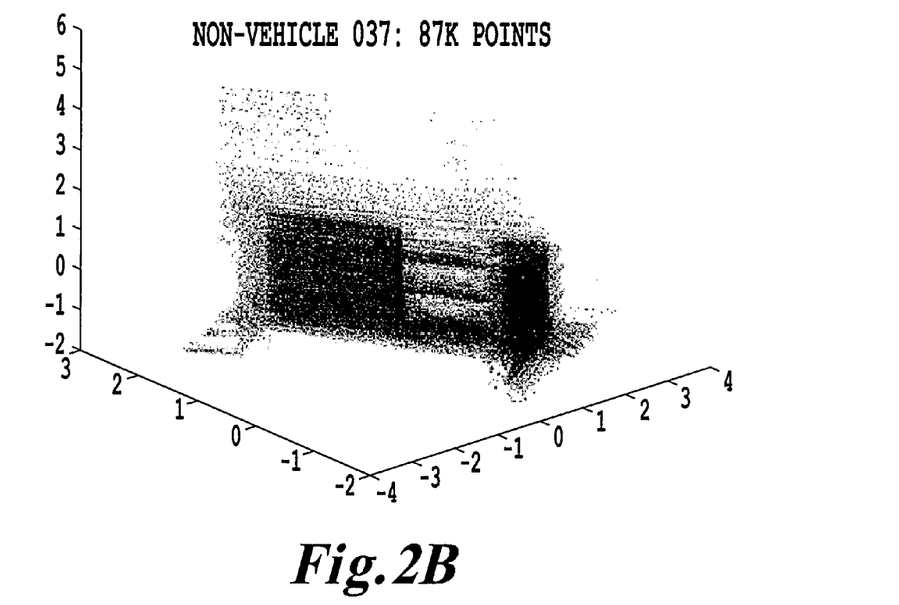

FIGS. 2A and 2B illustrate how two different classes of objects (vehicle and non-vehicle) may look when plotted in X, Y, and Z coordinates (normalized to be approximately zero mean and unity standard deviation). These figures show approximately 100,000 to 200,000 data points for each object collected over several seconds of observing the stationary objects from a moving platform equipped with the 3D scanner. The step of converting the platform-centered coordinates into stationary or moving with the object of interest X, Y, Z coordinates is understood by those of ordinary skill in the art and thus not described here. The object motion may reduce the number of points associated with the object, but the reduced number of points does not change the operation principle of this invention.

Figure 3A:
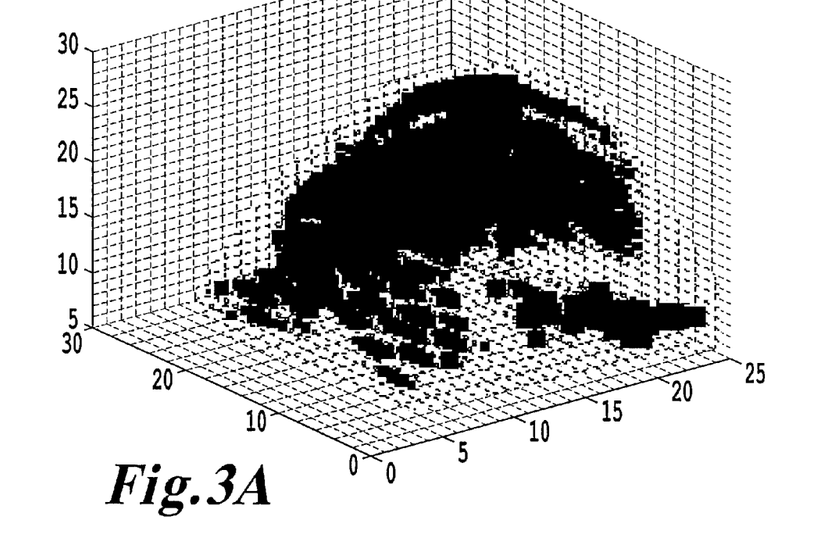
FIGS. 3A and 3B illustrate a binned representation of the vehicle and the non-vehicle according to an embodiment of the invention.
Figure 3B:
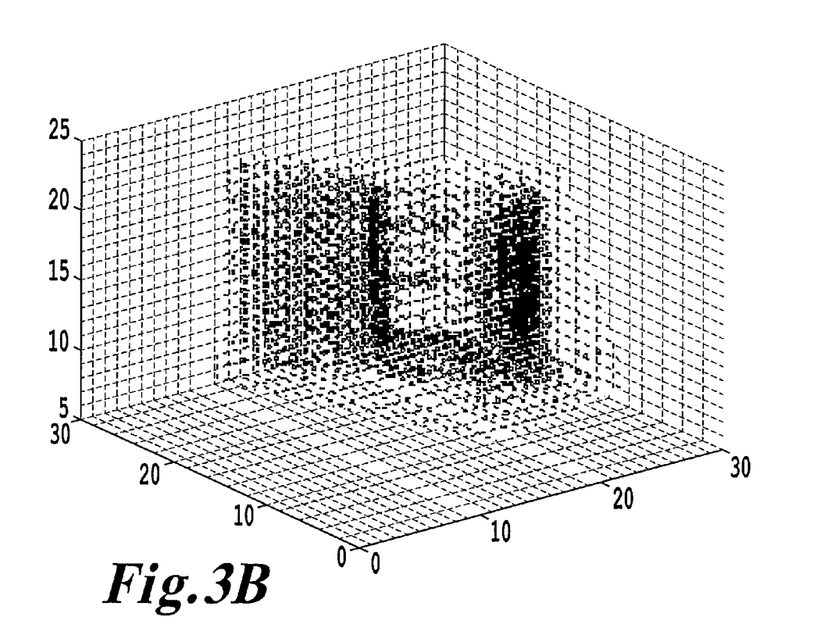

In step 103, the original 3D laser data points are binned into the pre-specified regions of the 3D space. For example, the regions can be defined as cubes of the 3D grid spanning the space occupied by the object. In addition, 3D rectangles may be advantageous to use as binned regions when the coordinates have different resolution along different axis. FIGS. 3A and 3B illustrate the objects of FIGS. 2A and 2B, respectively, after the binning operation has been performed. The size of the squares in FIGS. 3A and 3B reflect the relative density of the data points in particular bins.

Figure 4:
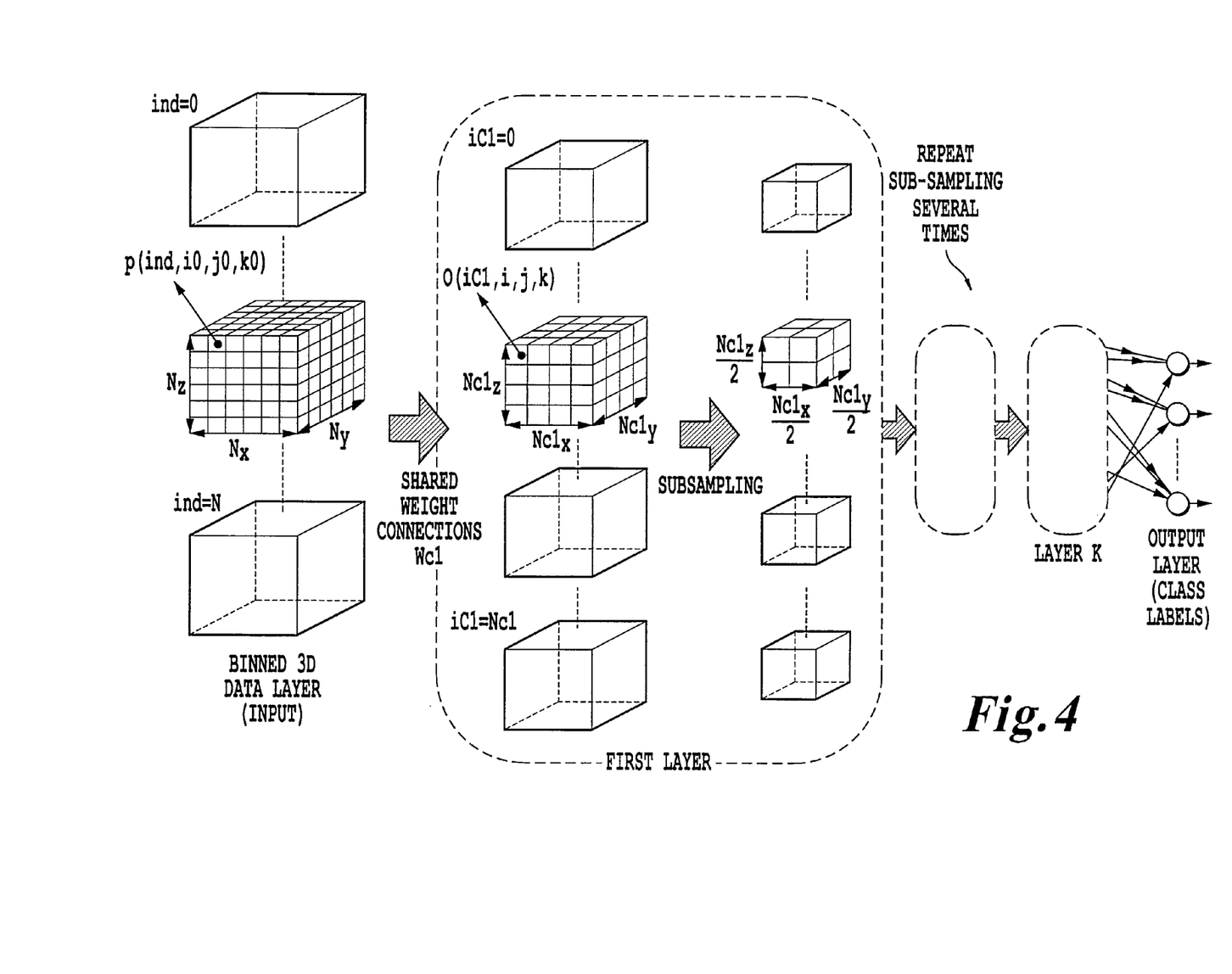
FIG. 4 illustrate a multi-layer object classification system according to an embodiment of the invention.

In step 105, the binned 3D data is processed by a computational system with shared adjustable parameters (weights). See FIG. 4 for an embodiment of the computational system. The local density of points in each bin is denoted p(ind,i,j,k) where ind is the index of the binned 3D data, and i, j, and k are coordinates of the bin (see FIGS. 2 and 3). The index ind may correspond to a different viewing angle of the same object, e.g., ind=0 may denote the binned 3D data for the object rotated 90 degrees from its default angle of viewing, and ind=1 may denote the binned 3D data for the object rotated −90 degrees from its default angle of viewing. The invention does not require multiple views (indexes) and can be implemented using only the default view of the 3D imaging device. However, to obtain a rotation invariant system, the present invention uses multiple binned 3D data as inputs for the system. The binned data show different viewing angles for the same objects as simultaneously presented to the system for object classification. This multi-view arrangement is shown in FIG. 4 where the input layer has multiple binned 3D views of the object indexed by the index ind.

The density values p are normalized over the entire set of points belonging to the same object (same index ind). Such a normalization can be done in a variety of ways, e.g., by computing an average density of points per bin and subtracting the average density from each bin's density. As an alternative, scaling by a standard deviation from the average density can be employed to normalize the density values p. Logarithmic normalization can also be employed if binned densities differ by orders of magnitude.

The density values p of the map are fed into a first layer of the system in step 107. The first layer includes Nc1 three-dimensional maps having a processing element O for each of the input bins. In each map, every processing element O is restricted to have the same values of weights Wc1 (adjustable parameters) connecting the processing elements O with elements of the inputs p(ind,i,j,k). These weights form the receptive field or the adaptive feature vector. By restricting the weights to have the same values among different processing elements O, the invention dramatically reduces the computational complexity of the overall system but also creates effective and adaptive feature detectors for learning various features of the object regardless of their location in the binned 3D data.

The number of weights Wc1 depends on the size of the receptive field of the processing elements in the first layer. Without loss of generality, the size of the receptive filed can be specified as dx, dy, and dz in coordinates of the binned 3D data. The processing elements O then implement generally a nonlinear transformation f (e.g., a hyperbolic tangent or a threshold) on a product of the weights Wc1 and the data. The number of weights Wc1 also depends on the connectivity pattern between the inputs and the first layer.

Figure 5:
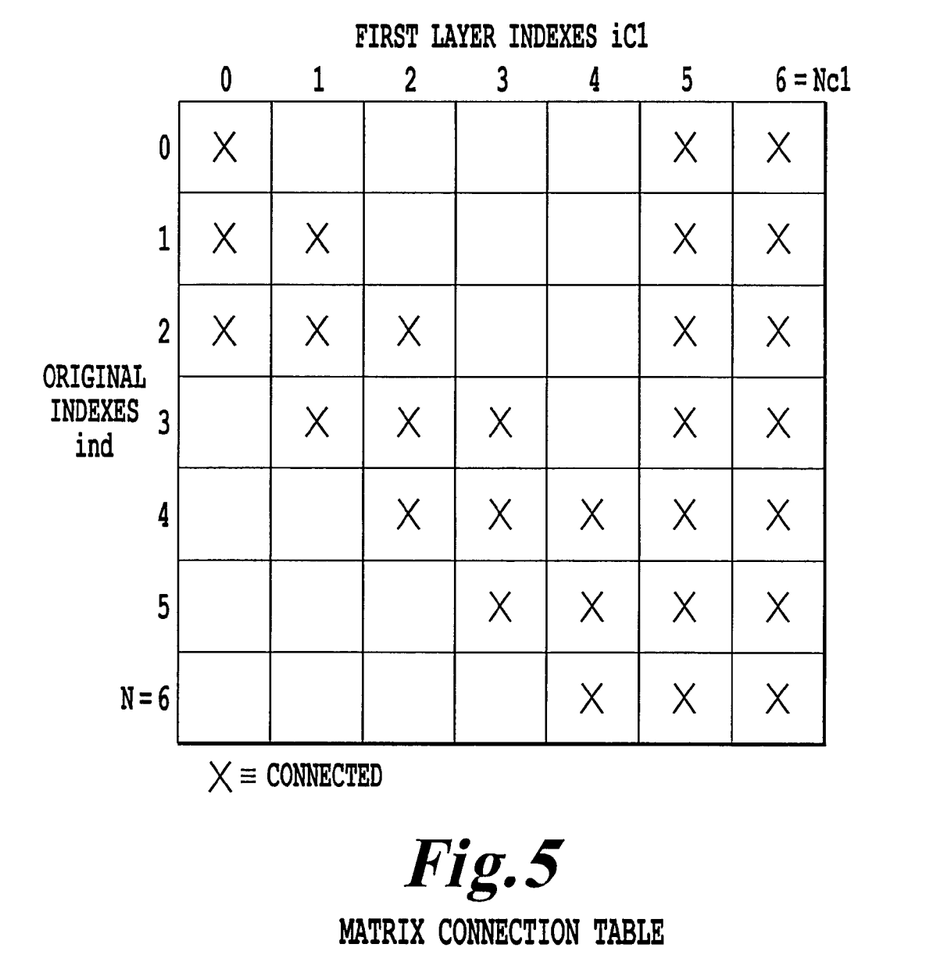
FIG. 5 illustrates a non-limiting example of a matrix connection table used to correlate original indexes of binned representations to indexes of a first layer of the computational system.
Figure 6:
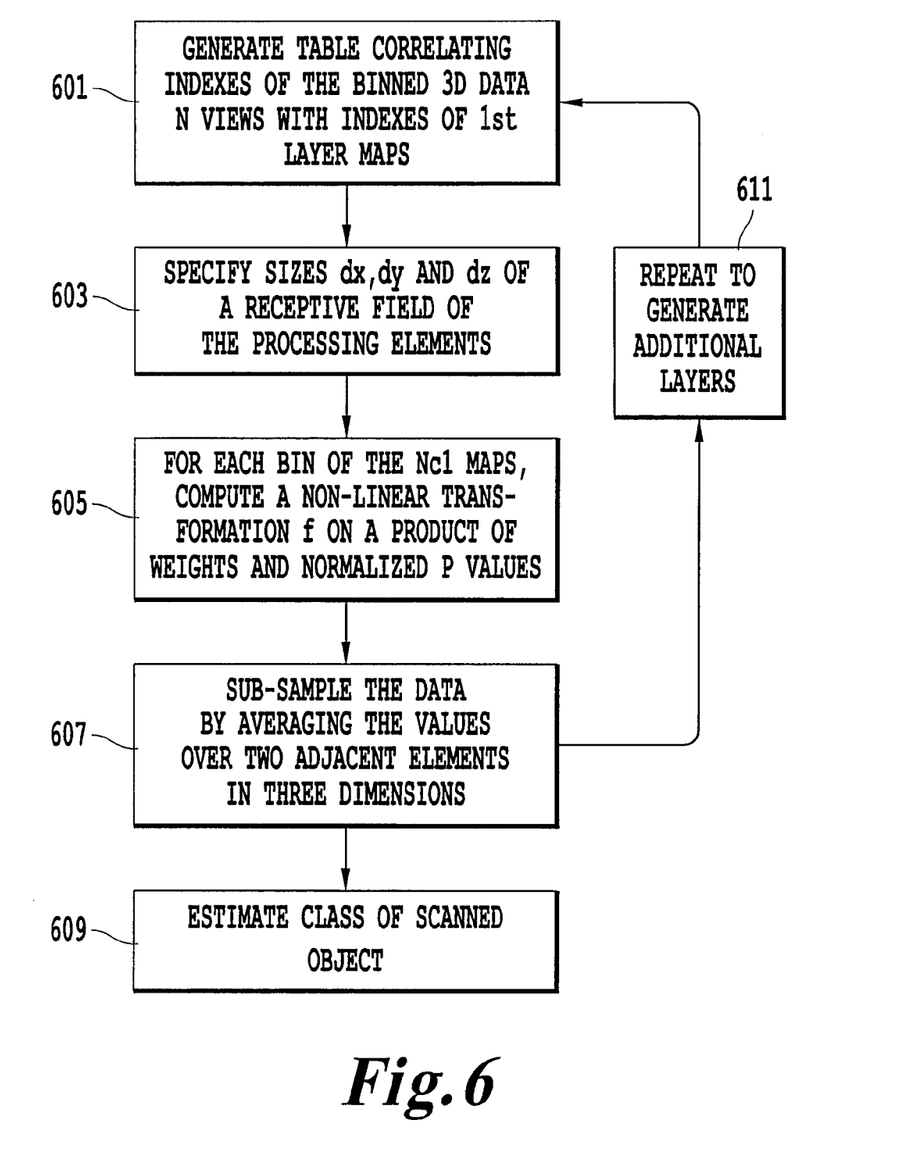
FIG. 6 is a flowchart illustrating steps for calculating the processing elements of the computational system.

The manner of calculating the processing elements O is described with reference to FIG. 6. The connectivity between the input elements and the processing elements O in the first layer of the computational system can be tracked using a matrix connection_table. See a non-limiting example of a connectivity table in FIG. 5. The connection_table's rows specify the indexes of the binned 3D data views, whereas its columns correspond to the indexes of the first layer's maps. The number of rows in the matrix connection_table is specified by elements of the vector num. The vector num stores the numbers of connections for each index IC1. With reference to FIG. 5 for example, num(0)=num(1)=num(2)=num(3)=num(4)=3, and num(5)=num(6)=7. In step 601, the matrix connection_table is generated. In step 603, the sizes dx, dy, and dz of the receptive field are specified.

The computations in the first layer of the system are illustrated in the pseudocode form below (C language notation):

```
for (ic1=0; ic1<Nc1; ic1++) {
    for (i=0; i<Nc1x; i++) {
        for (j=0; j<Nc1y; j++) {
            for (k=0; k<Nc1z; k++) {
                sum=0; wind=0;
                for (is0=0; is0<num(ic1); is0++) {
                    ind = connection_table(is0,ic1);
                    for (i0=i; i0<i+dx; i0++) {
                        // Nc1*+d* must be equal to N* (where * is x, y or z)
                        for (j0=j; j0<j+dy; j0++) {
                            for (k0=k; k0<k+dz; k0++)
                                sum = sum + p(ind,i0,j0,k0)*Wc1(ic1,wind);
                                wind = wind + 1;
                        }
                    }
                }
                sum = sum + Wc1(ic1,wind);   /* adding bias weight */
                o(ic1,i,j,k) = f( sum );
            }
        }
    }
}
```

The computations above can be repeated several times, thereby realizing a multi-layer processing system (FIG. 4). The system output estimates the class label. The system output is connected to all elements of the previous layer (see FIG. 4) and implements a nonlinear function, e.g., a hyperbolic tangent or a threshold, on the scalar product between the systems inputs and weights. See step 605. Without the loss of generality, a two-class classification problem is described, requiring just one output of the system. However, three or more classes can be estimated. The system can recognize more classes by adding more output elements, as shown in FIG. 4.

The system can also have sub-sampling layers which implement a mathematical operation of spatial sub-sampling. See step 607. This amounts to reducing the resolution of the binned 3D data by, for example, half for each coordinate of the binned space, i.e., averaging the outputs O(ic1,i,j,k) over two adjacent elements in three dimensions. Mathematically, and as an example, the output of the element (i,j,k) of the subsampling layer is (O(ic1,i,j,k)+O(ic1,i,j,k+1)+O(ic1,i,j+1,k)+O(ic1,i,j+1,k+1)+O(ic1,i+1,j,k)+O(ic1,i+1,j,k+1)+O(ic1,i+1,j+1,k)+O(ic1,i+1,j+1,k+1))/8. Similar to the outputs O(ic1,i,j,k), the local densities p(ind,i0,j0,k0) can also be subsampled before feeding them as inputs into the first layer maps, if desired.

By way of example, the computational system can be applied to the two-class (vehicle and non-vehicle) system illustrated in FIGS. 2A and 2B. According to one embodiment of the invention, if the network output of the two-class system is above zero, then the estimated class label is declared to belong to the vehicle class. If the network output is equal or below zero, then the estimated class label is declared to belong to the non-vehicle class.

Figure 7A:
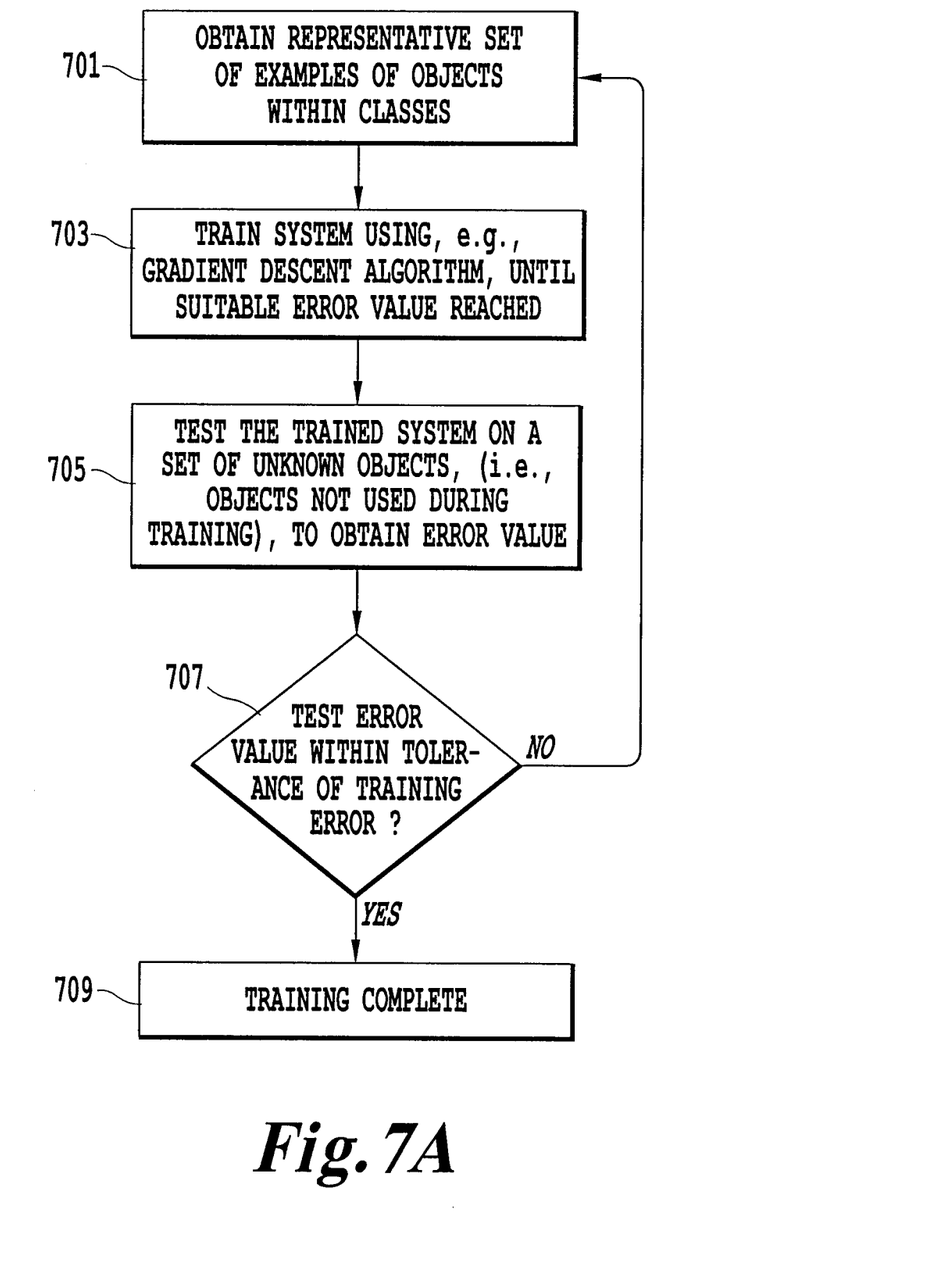
FIG. 7A is a flowchart illustrating steps for training the system according to an embodiment of the invention.

FIG. 7A is a flowchart illustrating steps for training the system according to an embodiment of the invention (supervised training). The first step (step 701) is to obtain a representative set of examples for each class of objects to be trained. For each class, the system can be trained (step 703)

using the Gradient Descent Algorithm, for example, until a suitable error value is reached (e.g., the root-mean-square error decreases sufficiently well on a validation data set). Other techniques for training are described in Training Recurrent Neurocontrollers for Robustness With Derivative-Free Kalman Filter by Danil V. Prokhorov which is hereby incorporated by reference.

In step 705, the trained system is tested on a set of data unseen by the system during the training process. The system is considered to be acceptable if the value of the test error function is close to that of the training error function (Decision 707). Otherwise, more training examples should be added and the training process repeated.

As an alternative training embodiment, the supervised training described above can be combined with the unsupervised training procedure described below. The goal of the unsupervised training is to recover the most useful adaptive features represented through the sets of weights Wc1 for ic1=0, 1, . . . , Nc1 based on the training data. It should be noted that such training does not utilize the class label information, hence it is called unsupervised training.

Figure 7B:
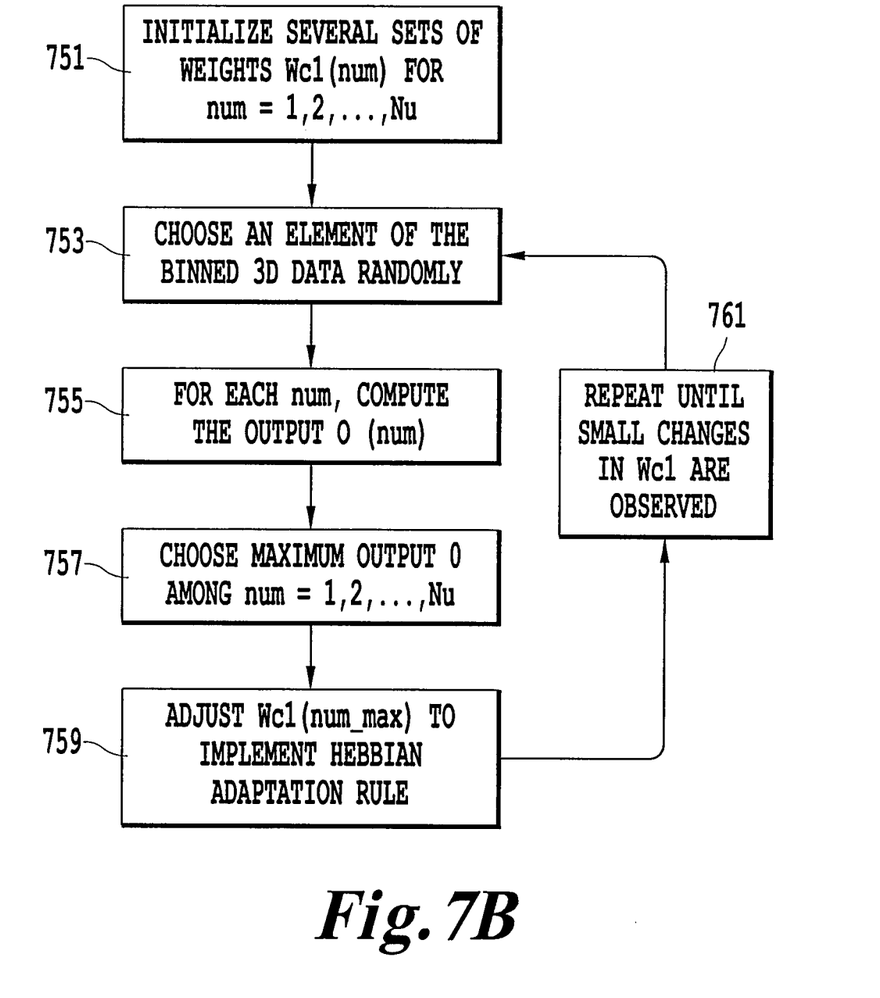
FIG. 7B is a flowchart illustrating steps for training the system according to a second embodiment of the invention.

FIG. 7B is a flowchart illustrating steps for training the system using unsupervised training. In step 751, several sets of weights Wc1(num) for num=1, 2, . . . , Nu are initialized. This process can be completed in a variety of ways, randomly or purposefully. A purposeful process would use prior information for assigning initial Wc1(num), e.g., it might be known that a particular feature exists in the data, hence it can be assigned to one of the sets Wc1. A random process would not use any prior information, e.g., all weights Wc1 might be set to random values in a particular range. The parameter age(num) is set equal to 1 for all num. In step 753, an element (i, j, k) of the binned data is chosen randomly. For each num, the output O(num) is computed in step 755. The computation includes (i) computing the scalar product (Wc1(num)*p(ind)) between the appropriate elements of the receptive field Wc1(num) and the data elements p(ind) centered around (i,j,k); (ii) computing the Euclidian norms of Wc1(num) and p(ind); and (iii) computing O(num)=f(scalar_product(Wc1(num)*p(ind))/(norm(Wc1(num))*norm(p(ind)))). In step 757, the maximum output O(num_max) is chosen from the outputs O generated for num=1, 2, . . . , Nu.

In step 759, Wc1(num_max) is adjusted according to the following equations to implement a form of the well known Hebbian adaptation rule. Other clustering methods can also be used.

determining mu mu=0, if age(num_max)≦t1;

mu=c*(age(num_max)−t1)/(t2−t1)  if  t1<age(num_max)≦t2;

mu=c+(age(num_max)−t2)/r  if  t2<age(num_max), where c, r, t1 and t2 are design parameters (e.g., c=2, r=2000, t1=20, t2=200);

p1(t)=(age(num_max)−1−mu)/age(num_max), p2(t)=(1+mu)/age(num_max);

Wc1(num_max,index)=p1(t)*Wc1(num_max,index)+p2(t)*p(ind,index)*O(num_max)

The unsupervised training process is repeated starting with step 753 until little changes in Wc1 are observed. For example, Norm(Wc1)<epsilon, where epsilon is a small positive number. In this unsupervised training algorithm, the parameter age is used to select Nc1 sets of weights Wc1 with sufficiently large age. This is completed by ordering the ages of all Nu processing elements and discarding those Nu-Nc1 elements whose age is smaller than a threshold. The set of weights Wc1 remains fixed (constant) in the subsequent supervised training (weights of other layers in the structure are trained in a supervised fashion till the adequate performance is attained).

The computational system of the present invention can be implemented using a microprocessor or its equivalent. The microprocessor utilizes a computer readable storage medium, such as a memory (e.g., ROM, EPROM, EEPROM, flash memory, static memory, DRAM, SDRAM, and their equivalents), configured to control the microprocessor to perform the methods of the present invention. The microprocessor, in an alternate embodiment, further include or exclusively include a logic device for augmenting or fully implementing the present invention. Such a logic device includes, but is not limited to, an application-specific integrated circuit (ASIC), a field programmable gate array (FPGA), a generic-array of logic (GAL), and their equivalents. The microprocessor can be a separate device or a single processing mechanism.

Obviously, numerous modifications and variations of the present invention are possible in light of the above teachings. It is therefore to be understood that within the scope of the appended claims, the invention may be practiced otherwise than as specifically described herein.

The invention claimed is:

1. A method, comprising:
    imaging an object in three-dimensions by collecting three-dimensional data points of the object;
    binning the data points of the imaged object into three-dimensional bins having a predetermined three-dimensional size to create a binned scanned object in a three-dimensional bin space;
    determining a density value of the data in each of the bins by calculating a number of the data points in each of the bins;
    inputting the density value of each of the bins into a first layer of a computational system including a corresponding processing element for each of the bins;
    calculating outputs of the processing elements, wherein all of the processing elements have weights of a same value connecting the processing elements to corresponding density values; and
    communicating an estimated class of the scanned object based on the calculated outputs, wherein the calculating includes:
    performing a nonlinear transformation on a product of a connected weight and the density value for each bin;
    sub-sampling the outputs by averaging the outputs over two adjacent processing elements in three dimensions; and
    repeating the calculating process using additional layers of the computational system, the output of the computational system connected to all processing elements of a last layer of the computational system.

2. The method of claim 1, wherein the data of the imaged object in three-dimensions is represented in a Cartesian coordinate system.

3. The method of claim 1, wherein the data of the imaged object in three-dimensions is represented in a spherical system.

4. The method of claim 1, wherein the nonlinear transformation includes applying a hyperbolic tangent to the product of the connected weight and the density value for each bin.

5. The method of claim 1, wherein a number of the weights depends on a connectivity pattern between the input density values and the processing elements in the first layer of the computational system.

6. The method of claim 1, wherein the estimated class of the scanned object is selected by the computational system from a group including at least two candidate classes.

7. The method of claim 1, wherein the imaging is accomplished with a three-dimensional scanning system.

8. The method of claim 1, wherein the imaging is accomplished with a three-dimensional non-scanning system.

9. A non-transitory computer readable medium having computer code stored thereon, the computer code, when executed by a computer, causing the computer to implement the method according to claim 1.

10. The method of claim 1, further comprising:
rotating the binned scanned object, creating N additional views of the binned scanned object, each view including the bins of the data points; and
determining weights for each of the N+1 views, wherein
the computational system includes three-dimensional maps,
each map includes processing elements for one of the N+1 views, and
each of the processing elements for one of the maps is connected to the corresponding density values of the corresponding view via the determined weights of the corresponding map.

11. The method of claim 10, further comprising:
normalizing the density values separately for each of the N+1 views.

12. A method, comprising:
imaging an object in three-dimensions by collecting three-dimensional data points of the object;
binning the data points of the imaged object into three-dimensional bins having a predetermined three-dimensional size to create a binned scanned object in a three-dimensional bin space;
determining a density value of the data in each of the bins by calculating a number of the data points in each of the bins;
inputting the density value of each of the bins into a first layer of a computational system including a corresponding processing element for each of the bins; and
calculating outputs of the processing elements, wherein all of the processing elements have weights of a same value connecting the processing elements to corresponding density values, wherein
the weights are obtained through unsupervised training of the computational system, and the unsupervised training includes:
initializing a plurality of weights Wc1(num) for num =1, 2,,... Nu, wherein Nu is a predetermined integer;
for each num, computing an output O for a randomly selected bin of data;
determining a num_max corresponding to a maximum computed output O;
adjusting the weight Wc1(num_max) to implement an unsupervised training algorithm; and
repeating the computing, determining, and adjusting steps until changes in the weights Wc1 are smaller than a predetermined value.

13. The method of claim 12, wherein the adjusting includes implementing a form of the Hebbian adaptation rule.

14. The method of claim 12, wherein the computing the output O includes:
computing a scalar product for each density value of bins adjacent the randomly selected bin of data, referred to as p(ind), by calculating Wc1(num)*p(ind); and
computing Euclidian norms of Wc1(num) and p(ind),
wherein the computed output O of the randomly selected bin is a function of the computed scalar products and the computed Euclidian norms.

15. The method of claim 12, wherein the calculating includes:
performing a nonlinear transformation on a product of a connected weight and the density value for each bin;
sub-sampling the outputs by averaging the outputs over two adjacent processing elements in three dimensions; and
repeating the calculating process using additional layers of the computational system, the output of the computational system connected to all processing elements of a last layer of the computational system.

16. A non-transitory computer readable medium having computer code stored thereon, the computer code, when executed by a computer, causing the computer to implement the method according to claim 12.

17. A method, comprising:
imaging an object in three-dimensions by collecting three-dimensional data points of the object;
binning the data points of the imaged object into three-dimensional bins having a predetermined three-dimensional size to create a binned scanned object in a three-dimensional bin space;
determining a density value of the data in each of the bins by calculating a number of the data points in each of the bins;
inputting the density value of each of the bins into a first layer of a computational system including a corresponding processing element for each of the bins; and
calculating outputs of the processing elements, wherein all of the processing elements have weights of a same value connecting the processing elements to corresponding density values, wherein
the weights are obtained through unsupervised training of the computational system, and the supervised training includes:
obtaining a representative set of examples of objects with the classes;
training the system using a supervised training algorithm until a predetermined error value is reached;
testing the trained system on a set of unknown objects to obtain error value;
determining whether the error value is within tolerance of a training error; and
repeating the supervised training process until the error value is within the tolerance of the training error.

18. The method of claim 17, wherein the supervised training algorithm is a form of an incremental optimization algorithm.

19. The method of claim 17, wherein the calculating includes:
performing a nonlinear transformation on a product of a connected weight and the density value for each bin;
sub-sampling the outputs by averaging the outputs over two adjacent processing elements in three dimensions; and
repeating the calculating process using additional layers of the computational system, the output of the computational system connected to all processing elements of a last layer of the computational system.

20. A non-transitory computer readable medium having computer code stored thereon, the computer code, when executed by a computer, causing the computer to implement the method according to claim 17.

* * * * *